Figure 1:
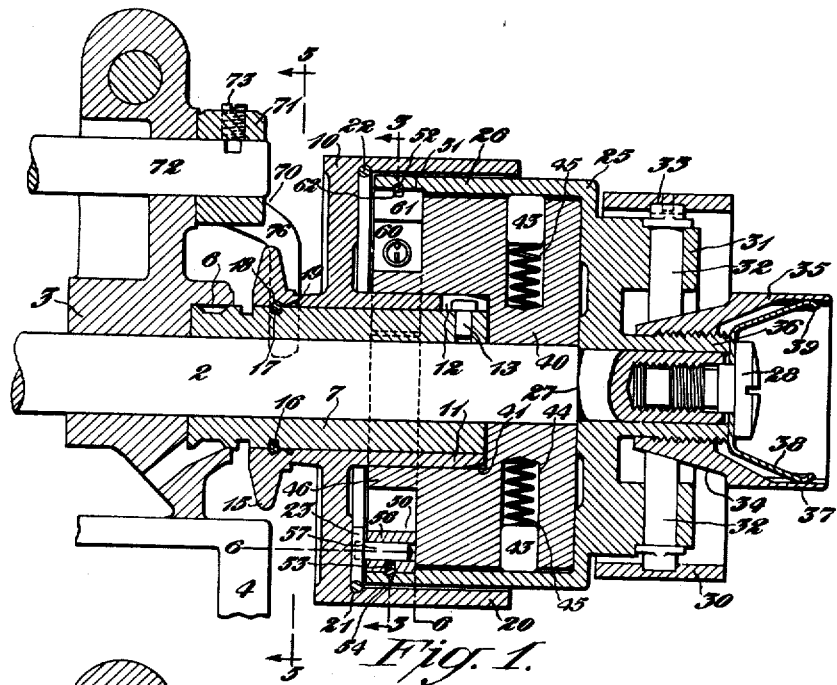

June 30, 1931.  C. F. SEARLE  1,811,974
CLUTCH
Filed July 26, 1929   3 Sheets-Sheet 1

Inventor:
Chester F. Searle
By
Watson, Cott, Morse & Grindle
Attorneys

June 30, 1931. C. F. SEARLE 1,811,974

CLUTCH

Filed July 26, 1929 3 Sheets-Sheet 2

Inventor:
Chester F. Searle
By
Watson, Crit, Morse & Grindle
Attorneys.

June 30, 1931.   C. F. SEARLE   1,811,974
CLUTCH
Filed July 26, 1929   3 Sheets-Sheet 3

Inventor:
Chester F. Searle
By
Watson, Orr, Morse & Grindle
Attorneys.

Patented June 30, 1931

1,811,974

UNITED STATES PATENT OFFICE

CHESTER F. SEARLE, OF CRANSTON, RHODE ISLAND, ASSIGNOR TO UNIVERSAL WINDING COMPANY, OF BOSTON, MASSACHUSETTS, A CORPORATION OF MASSACHUSETTS

CLUTCH

Application filed July 26, 1929. Serial No. 381,248.

This invention relates to an improved clutch for connecting one element to drive another, and particularly to a clutch adapted to impart rotary motion from the driving to the driven element with a slow start and a gradually accelerated speed.

One object of the invention is to provide a clutch of the type specified adapted for use on various types of machines to connect a shaft or other element for rotation from a pulley or other driver.

Another object of the invention is to provide a clutch of the character specified which will operate to start the rotation of the driven element at slow speed to eliminate shock and strain on the parts or to provide for a gradual take-up of the material being operated on in the machine.

Another object of the invention is to provide a clutch of the type specified having its elements of simple construction, compacted within a minimum space and proof against derangement and wear to provide for greater efficiency and durability over long periods of use.

Figure 2:
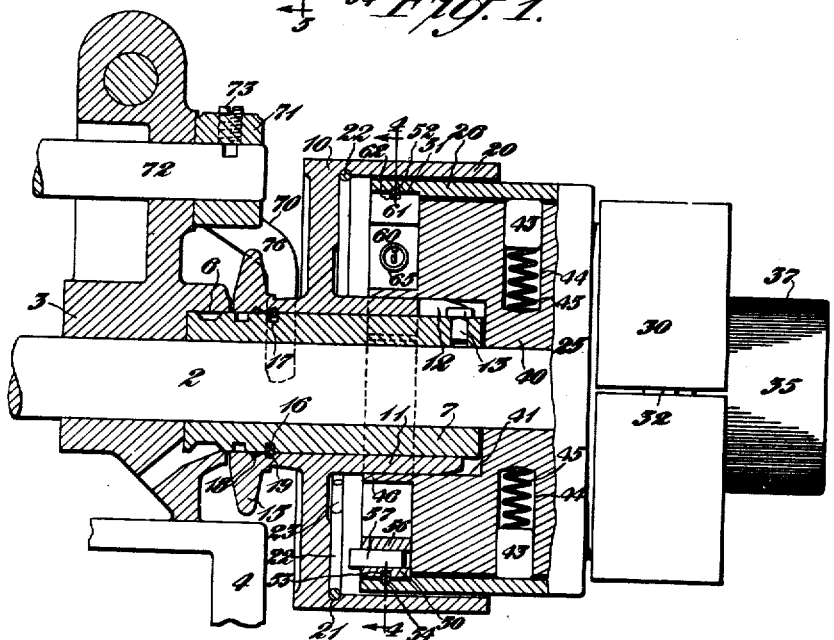
Figure 3:
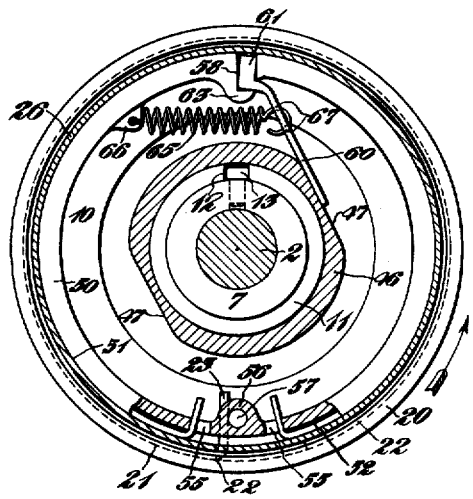
Figure 4:
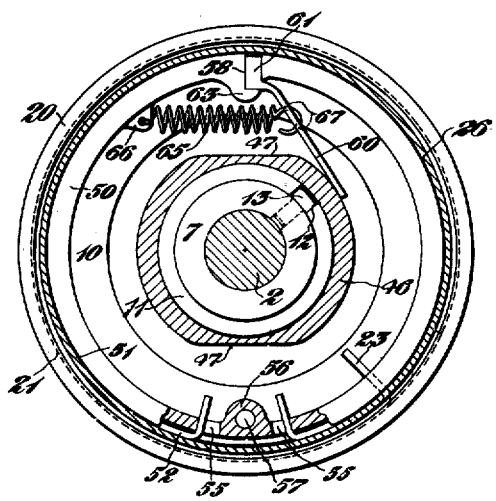
Figure 5:
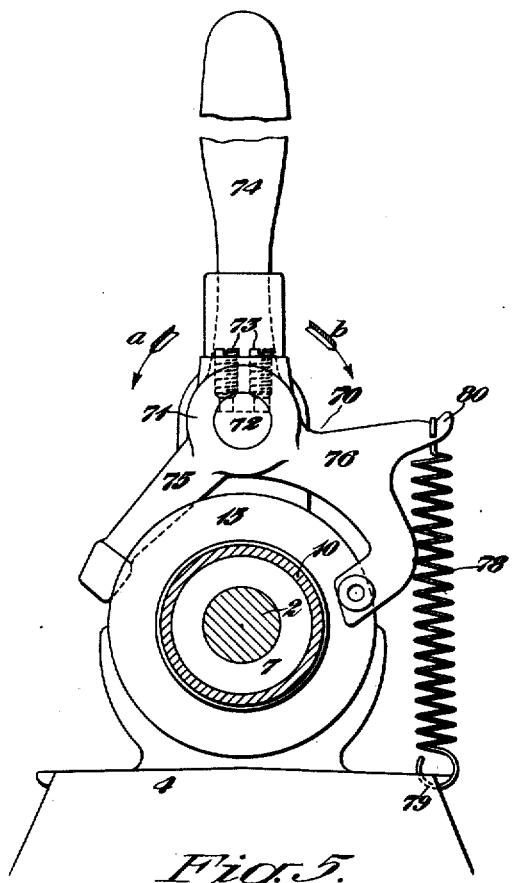
Figure 6:
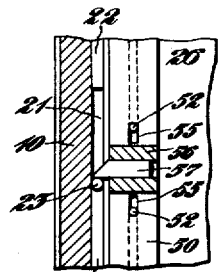
Figure 7:
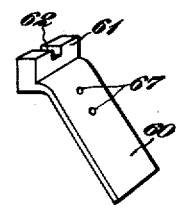
Figure 8:
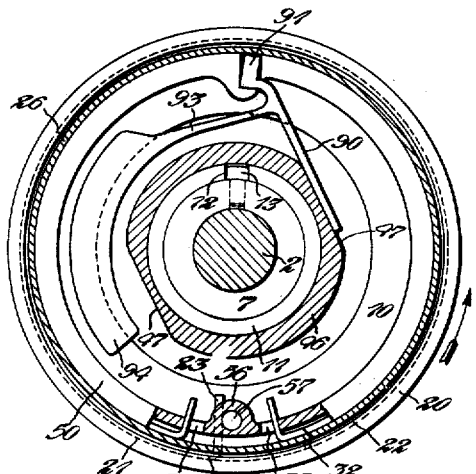
Figure 9:
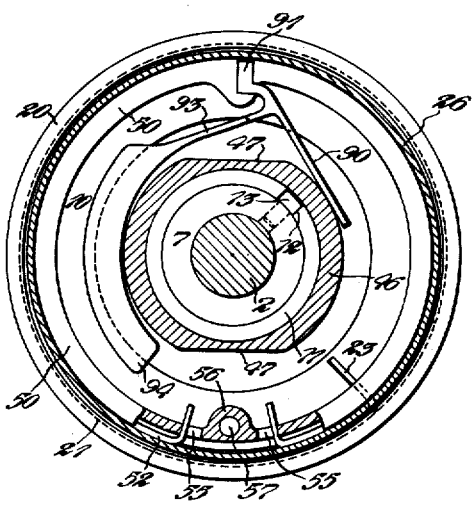
Figure 10:
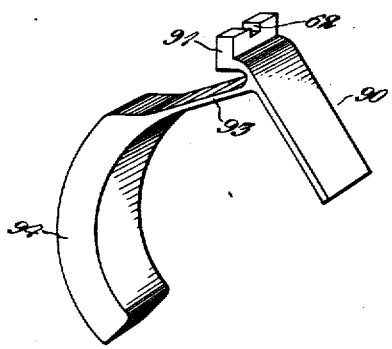

Further objects of the improvement are set forth in the following specification which describes a preferred form of construction of the invention by way of example as illustrated by the accompanying drawings. In the drawings:

Fig. 1 is a vertical sectional view through the axis of the clutch showing its parts in engagement to effect the drive between the driving and driven members; Fig. 2 is a similar part-sectional view showing the clutch-elements disengaged or declutched; Fig. 3 is a cross-sectional view of the device taken on line 3—3 of Fig. 1 looking in the direction indicated by the arrow; Fig. 4 is a similar cross-sectional view taken on line 4—4 of Fig. 2 looking in the direction of the arrow; Fig. 5 is a view showing one form of construction of the shifting-means for operating the clutch; Fig. 6 is a part-sectional view on line 6—6 of Fig. 1 illustrating a portion of the annular clutch-shoe and showing the means for connecting it with the driving-member; Fig. 7 is a perspective view of the lever for operating the friction clutch-shoe;

Fig. 8 is a view similar to Fig. 3 showing a modified form of lever for operating the clutch-shoe; Fig. 9 is a view similar to Fig. 4 showing the same modified form of lever in position to release the clutch-shoe; and Fig. 10 is a perspective view of the modified form of lever.

The present invention comprises in general a driving-member, a driven-member, friction means for clutching the driven-member with the driving-member, an inertia-element adapted to be set in motion by the driven-member and means actuated from the inertia-element to operate the friction means with an initial intermittent action whereby the driving-member will pick up the driven-member gradually to start the latter slowly and progressively accelerate its motion.

In the present embodiment of the invention the improved clutch is shown as adapted for use on winding machines to connect the winding-spindle to be rotated from a belt-pulley or other suitable driving-member. In machines of this type the winding-spindles are driven at a high rate of speed and in certain instances it is desirable to start their rotation slowly so as not to strain and break the delicate and tender materials being wound into cops or packages on the spindle. For instance, in winding silk, rayon and the like from skeins held on reels or swifts the inertia of the reel must be overcome as it is started to rotate to deliver the strand to the winding-spindle and if the rotation of the spindle is started abruptly the sudden pull on the strand is liable to break the latter. For this reason it is desirable to start the rotation of the winding-spindle slowly at first with a gradually accelerated speed and the present invention is particularly adapted for this purpose.

Referring now to the present drawings, the clutch may be applied to use on a shaft of any suitable form and dimension and, as herein shown, it is mounted on a horizontal shaft 2 which may constitute the rotatable spindle of a winding machine. The shaft 2 is journaled in suitable bearings 3 on a frame 4, a fragmentary portion only of which is herein shown, the opposite end of the shaft being arranged to project from the front of the frame to serve as the spindle on which the winding is performed. The end of the shaft-bearing 3 is counterbored at 6 to receive the end of a sleeve or bushing 7 rotatably mounted on the shaft 3 and providing the journal for the driving-member, for example, the belt-pulley 10.

The driving-member or pulley 10 has an extended hub 11 which is free to slide longitudinally of its bushing 7. In one end of the hub 11 is a slot 12 which is engaged by the head of a pin 13 driven into the bushing 7 to connect the latter to rotate with the pulley 10. The opposite end of the hub 11 extends beyond the side of the pulley 10 and is provided with a bevel-sided flange 15 which is adapted to be engaged by a lever or other suitable means to slide the driving-member 10 axially of its bushing 7. Detent-means are provided for maintaining the driving-member 10 in one or the other of the positions to which it is shifted, and such means may comprise a split spring-ring 16 held in a circumferential groove 17 on the periphery of the bushing 7. The spring-ring 16 is expansible to adapt it to snap into one or the other of two bevel-sided grooves 18 and 19 on the interior of the hub 11 of the pulley 10. It will be noted that the two grooves 18 and 19 are arranged in close proximity and their two adjoining walls are of less pitch or inclination than their outer separated walls. The purpose of this construction is to provide that the spring-ring 16 will slide easily up the incline of one groove to carry it into the other groove while the outer walls of the grooves will engage more positively with the ring to prevent further sliding action of the pulley 10 on its bushing 7.

The driving-member or pulley 10 has an overhanging rim 20, on the periphery of which is received the belt for connecting it to be driven from another pulley on a line shaft, motor or other prime-mover. In other instances, however, the pulley 10 may be constituted as a gear, sprocket or the like. On the interior face of the overhanging rim 20 of the pulley 10 is an annular groove 21 arranged adjacent the web thereof and adapted to receive a wire spring-ring 22 which serves as the element for connecting the pulley with a friction clutch-shoe to be later described. As shown in Figs. 3 and 4, one end of the wire ring 22 is bent radially inward to provide a finger or arm 23 adapted to be engaged by means on the clutch-shoe to rotatively connect the latter with the pulley 10.

In the present embodiment of the invention the driven-member 25 is constructed in the form of a disk or wheel secured fast on the end of the shaft 2 and having an overhanging rim or annulus 26 extending within the rim of the pulley 10. The member 25 is secured fast against a shoulder 27 on the reduced end of the shaft 2 by means of a screw 28 screwed into the end of the shaft. In the present form of construction the driven-member 25 carries a second belt-pulley which may be connected to drive another part of the machine, for example, the cam-shaft of the winding machine. For this purpose the pulley on the member 25 has a split ring 30, which may be expanded or contracted to adjust its diameter, whereby to alter the speed ratio between the shaft or spindle 2 and the part driven from the pulley. The expansible pulley may be of a type as generally employed on winding machines and its construction will therefore not be herein described in detail. The web of the member 25 is provided with an overhanging annulus 31 which is bored radially to receive a plurality of plunger-pins 32. The outer ends of the plungers 32 are received within a groove 33 on the inner face of the split ring 30, while their inner ends are beveled off at an angle to adapt them to engage with the tapered face 34 of a frusto-conical nut 35. The nut 35 is interiorly threaded to adapt it to screw onto the exteriorly threaded rub 36 of the member 25, and overhanging the end of the hub is a fluted rim 37 adapted to be grasped in the hand to turn the nut. A cup-shaped spring-washer 38, held against the end of the hub 36 of the member 25 by means of the screw 28, is provided with finger-like prongs 39 which engage with the flutes on the inside of the rim 37 of the nut 35 to hold the latter in its adjusted position. When the nut 35 is turned to screw it inwardly on the hub 36 its tapered portion 34 will force the plungers 32 radially outward to expand the split ring 30 and, vice versa, when the nut is turned in the opposite direction the plungers will slide inwardly under the contraction of the ring as the latter is reduced in diameter.

Housed within the overhanging rim 26 of the member 25 is a wheel or disk 40 constituting an inertia-element which serves as the means for exerting a drag to retard the rotation of the driven-member when the latter is first clutched to the driving-member. The inertia-element 40 is preferably constructed substantially solid to give it the required weight and is mounted free to rotate on the shaft 2. The element 40 is counterbored at 41 to adapt it to receive the end of the bushing 7 and the hub 11 of the driving-member 10. The outer periphery of the member 40 is of less diameter than the inner face of the rim 26 of the member 25 to provide a clearance therebetween so that the driven-member may be rotated free of the inertia-element. Engaging between the inertia-element 40 and the inner face of the rim 26 are spring-pressed plungers 43 which provide friction means for rotating the inertia-element from the driven-member. The plungers 43 may consist of short pins slidably mounted in radial bores 44 in the inertia-element 40 and urged outwardly by helical springs 45 pocketed in the bores. In the present construction two plungers are employed for providing frictional engagement between the driven-member and the inertia-element, but in other cases a greater number may be used if required.

Projecting from the side of the inertia-element 40 is a hub 46 which, as shown in Figs. 3 and 4, is flatted off on its opposite sides at 47. The hub 46 is in effect a cam for operating a lever which controls the clutching action of the friction shoe 50. This latter element takes the form of an annular band or split-ring surrounding the hub 46 and adapted when expanded to engage with the interior face 51 of the flange 26 on the driven-member 25. The clutch-shoe 50 is held in place laterally against the side of the inertia-element 40 by means of a spring-ring 52 which engages opposite circumferential grooves 53 and 54, formed respectively in the outer periphery of the shoe and the inner face 51 of the rim 26. As shown in Figs. 3 and 4 the spring-ring 52 may be formed of wire bent into circular shape to adapt it to be received within the grooves 53 and 54, and with its opposite ends turned inwardly to engage through slots 55 in the clutch-shoe 50.

On one side of the clutch-shoe 50 is a boss 56 carrying a pin 57 which projects from the side thereof to engage with the radial arm 23 of the spring-ring 22, see Figs. 3 and 6. On its opposite side the clutch-shoe 50 is split at 58 to adapt its ends to be spread apart whereby the whole shoe may be expanded to frictionally engage the interior face 51 on the driven-member 25. The expansion of the clutch-shoe 50 is effected by the action of a lever 60 having a block-like portion 61 positioned between the ends of the shoe. As shown more particularly in Fig. 7 the portion 61 of the lever 60 is slotted at 62 to receive the wire-ring 52 whereby to hold the lever in place between the ends of the shoe. It will be seen by reference to Fig. 3 that one end of the shoe 50 is provided with an underhanging lip 63 which engages beneath the portion 61 of the lever 60 to support the latter between the ends of the shoe.

A helical spring 65 is anchored to a lug 66 on the inner rim of the shoe 50 with its opposite end hooked through holes 67 in the arm of the lever 60. As illustrated in this view the spring 65 tends to rock the lever 60 to cant its block portion 61 across the opening between the ends of the clutch-shoe 50, whereby to spread the latter to expand the shoe into frictional engagement with the face 51 on the driven-member 25. It will be noted that this rocking action of the lever 60 can take place only when the end of the lever is opposite one of the flatted faces 47 on the cam-hub 46 of the inertia-element 40, see Fig. 3. When the parts are turned into such relation that the end of the lever 60 bears against the circular portion of the cam-hub 46 the lever will be maintained in the position shown in Fig. 4 to permit contraction of the clutch shoe, the method of cooperation between these parts being hereinafter more particularly explained.

It has been stated that the driving-member 10 is slidable axially on its bushing 7 to engage it with or disengage it from the clutch-shoe. It has also been noted that the axial movement of the member 10 is effected by the engagement of a suitable clutch-lever or the like with the beveled flange 15 of the member 10. Fig. 5 of the drawings illustrates a construction of clutch-lever as employed on winding machines for starting and stopping the operation thereof. As shown in this view the clutch-lever 70 is of double-arm construction, having its hub 71 secured fast to a rocker-shaft or rod 72 by set-screws 73 or other suitable means. The rod 72 may be mounted in bearings in the frame 4 above the bearings for the shaft 2 and arranged to be rocked by a handle-lever 74 carried on the opposite end of the rod, see Fig. 5.

One arm 75 of the clutch-lever 70 is adapted to engage with the left-hand side of the beveled flange 15 on the driving-member or pulley 10 to slide the latter to the right as viewed in Figs. 1 and 2 to effect the clutching action. The opposite arm 76 engages with the right-hand side of the flange 15 to slide the pulley 10 to the left as viewed in Figs. 1 and 2 to effect a declutching action, all in the manner as later more fully explained. The lever 70 may be operated from the handle 74 to rock it in the direction indicated by the arrow $a$ in Fig. 5 and, as herein illustrated, it is rocked in the opposite direction as indicated by the arrow $b$ by means of a helical spring 78 anchored to the frame 4 of the machine at 79 with its opposite end hooked over a finger or projection 80 on the arm 76 of the lever. Suitable detent-means may be provided for locking the lever 70 in position after it has been rocked manually to engage the clutch; and automatic stopping-mechanism is usually employed on the winding machine to release the detent-means whereby the lever 70 will be rocked under the action of the spring 78 to slide the member 10 to declutch the parts. The method of operation of the complete apparatus is as next explained.

The driving-member or pulley 10 is driven continuously from a belt passing around its periphery, or through other suitable means, and normally it rotates with its bushing 7 turning freely on the shaft 2 and the parts in the relationship as shown in Fig. 2 of the drawings. When it is desired to drive the shaft 2 from the pulley 10 the handle-lever 74 is rocked in the direction indicated by the arrow *a* in Fig. 5 to carry the arm 75 of the lever 70 down against the left-hand side of the flange 15 on the hub of the pulley. As the end of the arm slides radially inward on the inclined side of the flange 15 it acts with a wedging effect to slide the pulley 10 to the right or toward the outer end of the shaft 2.

The movement of the pulley 10 in this direction causes the spring-ring 16 to be contracted within its groove 17 in the bushing 7, whereby it is permitted to ride up the tapered side of the groove 19 and down the incline of the groove 18 in the hub of the pulley. In this way the spring-ring acts automatically as a detent to retain the pulley in the position to which it is shifted and, in addition, it has the further effect to cause the pulley to slide far enough to remove its flange 15 from contact with the lever 75. That is to say, the pressure of the spring-ring 16 on the beveled side of the groove 18 will give the pulley an additional degree of movement which carries its flange 15 away from the side of the lever 70. This last provision is for the purpose of preventing wear between the side of the clutch-lever and the flange 15 during the continuous running of the pulley 10.

As the pulley 10 is shifted into the position shown in Fig. 1 the radial arm 23 of the wire spring-ring 22 carried thereby will bring up against the pin 57 which projects from the side of the clutch-shoe 50, it being understood that the pulley 10 rotates in the direction indicated by the arrow in Fig. 3, or counter-clockwise as viewed from the outer end of the shaft 2. As the arm or finger 23 on the ring 22 comes into engagement with the pin 57 on the clutch-shoe 50 it will connect the latter to be rotated with the pulley 10; it being noted that the pressure against the side of the finger 23 tends to expand the spring-ring 22 so that it will bind in the groove 21 on the interior of the pulley 10 to effect a substantially positive clutching engagement therebetween.

As the clutch-shoe 50 is picked up by the pulley 10 and rotated in the same direction the lever 60 carried therewith will be moved around with it and, sooner or later, the tail-end of the lever will ride onto one of the flatted faces 47 on the periphery of the cam-hub 46. At this juncture the tension of the spring 65 will cause the lever 60 to be rocked to cant its portion 61 across the gap between the ends of the clutch-shoe 50 to force the latter apart and expand the shoe into frictional engagement with the clutch-face 51 on the driven-member 25. The shoe 50 will thereby be caused to initiate a rotary motion of the member 25, but due to the inertia of the parts connected therewith there will be some slippage between the clutch-shoe and the clutch-face 51 on the member 25. In other words, the full rotative motion of the pulley 10 will not be immediately communicated to the driven-member 25, but on the contrary the pulley 10 and the clutch-shoe 50 will move ahead of the driven-member so that the lever 60 will have a continuous relative movement with respect to the cam-hub 46. Consequently, the tail end of the lever 60 will immediately be carried off from the flatted face 47 of the cam onto its rounded surface and this will cause the lever 60 to be rocked against the action of its spring 65 to release the wedging or spreading effect of its portion 61 between the ends of the clutch-shoe 50. The clutch-shoe 50 will thus be released from the face 51 of the member 25 to relieve the clutching action whereby to prevent the driving-member from imparting its full rotative impulse to the driven-member.

Now, as the pulley 10 continues to rotate ahead of the driven-member 25, the tail-piece of the lever 60 will again be carried around onto the opposite flatted face 47 of the cam-hub 46 to cause reengagement of the clutch-shoe with the face 51 on the driven-member. The driven-member 25 will thereby be given a further rotative impulse and this intermittent clutching and declutching action of the shoe 50 with the member 25 continues until the speed of the driven-member equals that of the driving-member. When this point is reached the tail of the clutch-lever 60 will remain resting on one of the flatted faces 47 of the cam-hub 46 and the clutch-shoe 50 will continue to be fully engaged with the clutch-face 51 on the member 25. Consequently, the member 10 will thereafter continue to drive the member 25 until it is declutched therefrom in the manner as later explained.

Reference has been made to the inertia-element 40 which serves as one means for retarding the rotative movement of the driven-member 25 during the clutching action. The element 40 is free to turn on the shaft 2 independently of the other elements of the device and due to its weight it lags behind the member 25 as the motion of the latter is started. A certain degree of motion will be imparted to the inertia-element 40 as the driven-member 25 is picked up by the clutch-shoe 50 due to the frictional engagement between the spring-pressed plungers 43 and the interior of the flange 26 on the member 25. Due to the arrangement of the parts as above described the clutch-controlling lever 60 will be caused to move around the periphery of the cam-hub 46 on the element 40 at a relatively rapid rate at the start of the clutching action, but as the element 40 picks up momentum through its frictional engagement with the member 25 the lever 60 will travel more slowly with respect to the cam-hub 46 and therefore the period of engagement of the clutch-shoe with the clutch-face 51 will be gradually lengthened to increase the clutching effect. Finally, as the inertia-element 40 reaches the speed of the driven-member 25 the lever 60 will remain fixed in its relation thereto with its tail-piece bearing on the flatted portion of the cam-hub 46 as all of the several parts rotate together at the same speed. It will thus be seen that the lost motion between the inertia-element and the driven-member 25 provides a deterrent effect to retard the full clutching action. It is noted, however, that for some purposes the inertia-element may be dispensed with and the cam-action on the clutch-shoe be effected directly from the lost motion or slippage between the shoe and the member 25.

It will be observed from the above explanation that the device operates to clutch the driving-member with the driven-member with an intermittent action so that the shaft 2 which is positively connected to the member 25 is started to rotate slowly and its speed gradually accelerated until it turns at the same rate as the driving-member 10.

To arrest the rotation of the shaft 2 the clutch-lever 70 is operated from the spring 78 to carry its arm 76 down against the right-hand side of the tapered flange 15. The arm 76 will thus act with a wedging effect to slide the pulley 10 to the left, as viewed in Figs. 1 and 2, and the spring-ring 16 will again function to continue the sliding movement of the pulley sufficiently to carry the flange 15 away from the side of the lever. As the pulley 10 is slid to the left into the position shown in Fig. 2 the arm 23 of the spring-ring 22 will ride off from the end of the pin 57 and thereby the clutch-shoe 50 will be released. As the rotative impulse is removed from the clutch-shoe 50 the driven-member 25 will cease to be driven from the pulley 10 and, if desired, a suitable braking-means may be employed to bring the shaft 2 to a quick stop. Meanwhile, however, the inertia-element 40 will have a tendency to rotate ahead of the driven-member 25 and one of the cylindrical surfaces on the cam-hub 46 will thus be brought around opposite the tail-piece on the lever 60 so that the latter will be moved to permit contraction of the clutch-shoe 50 to effect its release from the clutch-face 51. The parts will therefore come to rest in this position as illustrated in Fig. 4, although this is not essential to the proper working of the device when it is desired to clutch the driving-member with the driven-member again.

Figs. 8 and 9 of the drawings illustrate the clutch-device with its main elements having the same construction as first described, but with the operating-lever for the clutch-shoe of different form to adapt it to be controlled under the action of centrifugal force instead of by a spring. As shown most clearly in Fig. 10, the lever 90 is a duplicate of the lever 60 previously described with respect to its block 91 inserted between the ends of the clutch-shoe 50 to adapt it to expand the latter, and also as having a tail-piece or flat arm arranged to ride on the periphery of the cam-hub 46. Projecting at an angle to the tail-piece of the lever 90 is an arm 93 which is continued in an arcuately shaped extension 94, thickened toward its end to form a weight. The weighted portion 94 of the lever 90 partly encircles the cam-hub 46 without contact therewith and is influenced by centrifugal force to rock the lever to cant its block 91 across the opening between the ends of the clutch-shoe 50 to expand the latter into frictional engagement with the clutch-face 51 on the driven-member 25.

When the driving-member or pulley 10 is slid on its bushing 7 to engage the arm 23 on the ring 22 with the pin 57 in the clutch-shoe 50 the latter will be rotated with the pulley in the manner as before explained. As the clutch-shoe 50 starts to turn with the pulley 10 the weighted arm 93 of the lever 90 will have a tendency to swing outwardly under the influence of centrifugal force so that as the tail-piece of the lever comes into position opposite one of the flat faces 47 on the cam-hub 46 the block 91 is rocked to expand the clutch-shoe 50 as shown in Fig. 8. As the lever 90 continues its travel around the hub 46, before the inertia-element 40 begins to rotate at full speed, the tail-piece of the lever will engage intermittently with the cylindrical surfaces of the hub to rock its block 91 to contract the clutch-shoe, this action of the lever being substantially the same as when controlled by a spring as first described.

The modified form of construction as last described has the advantage of dispensing with the spring which is liable to deterioration in use, and further, it makes for an easier and more gradual pick-up of the driven-member since the response of the operating-lever to the action of centrifugal force is more sluggish.

It will be observed from the foregoing that the present invention provides a particularly simple and efficient clutch for the purpose specified with its parts compacted within a minimum space and the working elements entirely enclosed to protect them and prevent interference with their operation. It has been determined that the winding-spindle, or any other element to be driven, may be started to rotate at slow speed without shock or jar on the driven parts and with a smooth even motion which is gradually accelerated to the maximum speed of the driving-member.

The device is adapted for use on various types of machinery and is so designed as to prevent wear or derangement of its parts while providing for a smooth, quiet action for the purpose intended.

While the invention is herein illustrated as embodied in a device for clutching a driving-pulley with a shaft, it is to be understood that the design and construction of the device may be varied to adapt any form of driving-element to pick up and drive a driven-element, and that further modifications may be made in the arrangement of the parts of the device without departing from the spirit or scope of the invention. Therefore, without limiting myself to the exact embodiment of the invention as herein disclosed, I claim:

1. In a clutch, the combination of a driving-member, a driven-member, an inertia-element adapted to be set in motion by one of said members, and means operated by the relative movement of the driving-member with respect to the inertia-element to initially clutch the two members together with an intermittent action to start the driven-member at slow speed and to finally clutch the two members together to drive the driven-member at the same speed as the driving-member.

2. In a clutch, the combination of a driving-member, a driven-member, friction means for connecting the driving-member to drive the driven-member, and an inertia-element adapted to be set in motion by one of said members and having means for initially operating said friction means to cause the driving-member to pick up the driven-member with an intermittent clutching action whereby the driven-member is started to move slowly and its speed gradually accelerated until it equals the speed of the driving-member.

3. In a clutch, the combination of a driving-member, a driven-member, a clutch-shoe for frictionally connecting the driving-member with the driven-member, and an inertia-element adapted to be set in motion by one of said members to operate the clutch-shoe to cause it to initially engage the driven-member with an intermittent action whereby the driven-member is started to move slowly and its motion accelerated until it reaches the speed of the driving-member.

4. In a clutch, the combination of a driving-member, a driven-member, a clutch-shoe connected to one of the members and adapted to frictionally engage the other member to clutch the two members together, an inertia-element adapted to be set in motion by one of said members to operate the clutch-shoe with an intermittent action to allow lost motion between the two members at the start of the clutching engagement, and means for finally maintaining the clutching action continuous to cause the driving-member to drive the driven-member at the same rate of speed.

5. In a clutch, the combination of a driving-member, a driven-member, a clutch-shoe adapted to be moved by and with the driving-member and to engage the driven-member to drive the latter, means for operating the clutch-shoe to engage it with the driven-member, and an inertia-element adapted to be set in motion by one of said members to actuate the shoe-operating means from the relative movement of the driving-member with respect to the said inertia-element whereby the clutch-shoe will be intermittently engaged and released to cause the driving-member to pick up the driven-member slowly with a gradually accelerated speed, said inertia-element acting when the speed of the driven-member equals that of the driving-member to effect a continuous engagement of the clutch-shoe with the driven-member.

6. In a clutch, the combination of a driving-member, a driven-member, a clutch-shoe for connecting the driving-member to drive the driven-member, a lever for operating the clutch-shoe, an inertia-element adapted to be set in motion by one of said members and having a cam for actuating said lever, and means whereby the movement of one member with respect to the other member will cause the cam to actuate the lever to operate the clutch-shoe intermittently to pick up the driven-member with a slow start, said cam being adapted to effect a continuous engagement of the clutch-shoe with the driven-member when the speed of the latter reaches that of the driving-member.

7. In a clutch, the combination of a rotating driving-member, a rotatable driven-member, a clutch-shoe for frictionally connecting said members, an inertia-element adapted to be set in motion by one of said members to operate the clutch-shoe intermittently to initially connect the driven-member with the driving-member to permit lost motion therebetween, and means to effect continuous action of the clutch-shoe when the speed of the driven-member equals that of the driving-member.

8. In a clutch, the combination of a driving-member, a driven-member, a clutch-shoe for frictionally engaging the driven-member, means for connecting the clutch-shoe to be moved with the driving-member, and an inertia-element adapted to be set in motion by one of said members to operate the clutch-shoe when it is started to move with the driving-member to cause it to initially engage the driven-member intermittently to pick up the latter gradually and to finally engage the driven-member continuously when the speed of the latter reaches that of the driving-member.

9. In a clutch, the combination of a driving-member, a driven-member, a clutch-shoe for frictionally engaging the driven-member, means for connecting the clutch-shoe to be moved by and with the driving-member, an inertia-element adapted to be set in motion by one of said members to intermittently engage the clutch-shoe with the driven-member when it is first connected to the driving-member whereby to start the driven-member slowly, and means to effect continuous engagement of the clutch-shoe with the driven-member when the speed of the latter has been accelerated to equal that of the driving-member.

10. In a clutch, the combination of a driving-member, a driven-member, friction means for clutching the driven-member with the driving-member, an inertia-element adapted to be set in motion by the driven-member, and means actuated from the inertia-element to operate the friction-means with an initial intermittent action whereby the driving-member will pick up the driven-member gradually to start the latter slowly and progressively accelerate its motion.

11. In a clutch, the combination of a driving-member, a driven-member, a clutch-shoe adapted to frictionally engage the driven-member, means for connecting the driving-member to drive the clutch-shoe, a lever for operating the clutch-shoe to engage it with the driven-member, and a cam acting on the lever when the clutch-shoe is driven from the driving-member to cause it to operate the clutch-shoe with an intermittent action to start the driven-member slowly and to eventually effect a continuous engagement of the clutch-shoe with the driven-member when the speed of the latter reaches that of the driving-member.

12. In a clutch, the combination of a driving-member, a driven-member, a clutch-shoe for frictionally connecting the driven-member with the driving-member, means for operating the clutch-shoe, an inertia-element adapted to be moved from the driven-member at a retarded rate of speed, and a cam on the inertia-element for actuating the operating-means to initially engage the shoe intermittently with the driven-member and to finally engage the shoe continuously therewith as the inertia-element is driven at the same rate of speed as the driving-member.

13. In a clutch, the combination of a rotating driving-member, a rotatable driven-member, an annular clutch-shoe adapted to engage the driven-member, means on the driving-member for engaging the clutch-shoe to rotate the latter, a lever for operating the clutch-shoe to frictionally engage it with the driven-member, and a cam for operating the lever to engage the clutch-shoe with the driven-member with an intermittent action to cause the driven-member to be rotated from the driving-member with a slow start and a gradually accelerated speed.

14. In a clutch, the combination of a rotating driving-member, a rotatable driven-member, an annular clutch-shoe adapted to frictionally engage the driven-member, a lever for operating the clutch-shoe to engage it with the driven-member, means for connecting the clutch-shoe to be rotated from the driving-member, an inertia-element rotatable independently of the driving- and driven-members, friction-means for driving the inertia-element from the driven-member, and a cam on the inertia-element adapted to act on the shoe-operating lever to effect an intermittent engagement of the shoe with the driven-member.

15. In a clutch, the combination of a rotating driving-member, a rotatable driven-member, an annular clutch-shoe adapted to frictionally engage the driven-member, a lever for operating the clutch-shoe, an inertia-element rotatable independently of the driving- and driven-members, resiliently-operated means for frictionally connecting the driven-member to rotate the inertia-element at a retarded rate of speed, and cam-faces on the inertia-element adapted to wipe across the lever to actuate the latter to intermittently engage the clutch-shoe with the driven-member.

16. In a clutch, the combination of a rotating driving-member, a rotatable driven-member, an expansible clutch-shoe adapted to engage the driven-member, means for connecting the driving-member to rotate the clutch-shoe, an inertia-element rotatable independently of the driving- and driven-members, friction-means connecting the driven-member to rotate the inertia-element at a retarded rate of speed, a lever for expanding the clutch-shoe into engagement with the driven-member, and cam-faces on the inertia-element engaging the lever to periodically actuate the latter to intermittently expand the clutch-shoe into engagement with the driven-member.

17. In a clutch, the combination of a rotating driving-member, a rotatable driven-member, a clutch-shoe adapted to frictionally engage the driven-member, means for connecting the driving-member to rotate the clutch-shoe, means for shifting the driving-member to connect it with and disconnect it from the clutch-shoe, a lever for operating the clutch-shoe to engage it with the driven-member, an inertia-element rotatable independently of the driving- and driven-members, friction-means for connecting the driven-member to rotate the inertia-element at a retarded rate of speed, the cam-faces on the inertia-element engaging the lever to periodically actuate the latter to intermittently engage the friction-shoe with the driven-member.

18. In a clutch, the combination of a rotating driving-member, a rotatable driven-member having an annular clutch-face, a clutch-shoe for engaging the clutch-face on the driven-member, means for connecting the driving-member to rotate the clutch-shoe, a lever for operating the clutch-shoe to cause it to frictionally engage the clutch-face on the driven-member, an inertia-element rotatable independently of the driven-member, friction-means for connecting the driven-member to rotate the inertia-element, and a cam rotatable with the inertia-element and adapted to periodically operate the lever to intermittently engage the clutch-shoe with the driven-member whereby to start rotation of the latter at a slow rate of speed which is gradually accelerated with the increasing speed of the inertia-element until all of the elements rotate together at the same speed.

19. In a clutch, the combination of a rotatable driving-member adapted to slide longitudinally of its axis, a driven-member provided with an annular clutch-face, a clutch-shoe carried by the driven-member in position to engage its clutch-face, a lever for operating the clutch-shoe to engage it with the clutch-face, means for connecting the driving-member to rotate the clutch-shoe, means for sliding the driving-member to connect it with and disconnect it from the clutch-shoe, and a cam adapted to be rotated with the driven-member and provided with cam-faces adapted to engage interchangeably with the lever to cause it to operate the clutch-shoe to intermittently engage it with the driven-member to start the latter slowly with a gradually accelerated rate of speed.

20. In a clutch, the combination of a driving-member, a spring-ring frictionally engaging the driving-member and provided with a radial arm, a driven-member provided with an annular clutch-face, an annular clutch-shoe carried on the driven-member and provided with means adapted to be engaged by the arm on the spring-ring carried by the driving-member, a lever for operating the clutch-shoe to frictionally engage it with the driven-member, and a cam operating on the lever to actuate the latter to intermittently engage the clutch-shoe with the driven-member to start the rotation of the latter slowly with a gradually accelerated speed.

21. In a clutch, the combination of a rotating driving-member, a rotatable driven-member having an annulus provided with a clutch-face, an annular clutch-shoe adapted to engage the clutch-face on the driven-member, an inertia-element enclosed within the annulus of the driven-member and rotatable independently thereof, friction-means for connecting the inertia-element to be rotated from the driven-member, a lever for operating the clutch-shoe, and a cam carried by the inertia-element and adapted to periodically operate the lever to effect intermittent engagement of the clutch-shoe with the driven-member to start the rotation of the latter slowly with a gradually accelerated speed.

22. In a clutch, the combination of a shaft, a driving-member rotatable on said shaft, a driven-member connected to rotate the shaft, a clutch-shoe adapted to frictionally engage the driven-member, means for connecting the driving-member to rotate the clutch-shoe, a lever for operating the clutch-shoe, and a cam for actuating the lever to intermittently engage the clutch-shoe with the driven-member to connect it to be driven from the driving-member with a slow start and a gradually accelerated rate of speed.

23. In a clutch, the combination of a driving-member, a driven-member, a clutch-shoe for connecting the driving-member to drive the driven-member, a lever arranged to be actuated under the influence of centrifugal force to operate the clutch-shoe, and means for controlling the action of the lever to cause the clutch-shoe to be initially operated intermittently to start the driven-member slowly.

24. In a clutch, the combination of a driving-member, a driven-member, a clutch-shoe adapted to frictionally engage one of said members to clutch it to the other member, a weighted lever adapted to be moved under the action of centrifugal force to operate the clutch-shoe, and a cam on which the lever rides as it rotates with the clutch-shoe to cause the lever to be periodically moved against the influence of centrifugal force whereby it operates the clutch-shoe initially with an intermittent action to start the driven-member gradually.

25. In a clutch, the combination of a driving-member, a driven-member, a clutch-shoe for connecting the driving-member to drive the driven-member, a weighted lever adapted to be actuated by centrifugal force to operate the clutch-shoe, an inertia-element, and a cam on the inertia-element engaging the lever to control its action whereby to initially operate the clutch-shoe intermittently to start the driven-member slowly while gradually accelerating its speed.

26. In a clutch, the combination of a driving-member, a driven-member, a clutch-shoe for frictionally engaging the driven-member, a weighted lever adapted to be actuated under the influence of centrifugal force to engage the clutch-shoe with the driven-member, and a rotating cam for controlling the movement of the lever, said cam having a rate of movement initially slower than that of the driving-member whereby it causes the lever to operate the clutch-shoe intermittently to pick up the driven-member gradually with a slow start and a progressively accelerated speed.

27. In a clutch, the combination of a driving-member, a driven-member, a clutch-shoe for engaging the driven-member, an inertia-element adapted to be set in motion by the driven-member, a weighted lever for operating the clutch-shoe under the influence of centrifugal force, and a cam on the inertia-element engaging the lever to effect an intermittent action thereof at the start of the clutching operation whereby to pick up the driven-member slowly and gradually accelerate its speed.

28. In a clutch, the combination of a rotating driving-member, a rotatable driven-member, a clutch-shoe for engaging the driven-member, an inertia-element adapted to be rotated from the driven-member at a retarded rate of speed, a weighted lever adapted to be moved by centrifugal force to operate the clutch-shoe to engage it with the driven-member, and a cam on the inertia-element engaging the lever to move it in opposition to centrifugal force whereby the clutch-shoe is operated with an intermittent action at the start of the clutching action to cause it to pick up the driven-member gradually.

In testimony whereof I hereunto affix my signature.

CHESTER F. SEARLE.

clutching operation whereby to pick up the driven-member slowly and gradually accelerate its speed.

28. In a clutch, the combination of a rotating driving-member, a rotatable driven-member, a clutch-shoe for engaging the driven-member, an inertia-element adapted to be rotated from the driven-member at a retarded rate of speed, a weighted lever adapted to be moved by centrifugal force to operate the clutch-shoe to engage it with the driven-member, and a cam on the inertia-element engaging the lever to move it in opposition to centrifugal force whereby the clutch-shoe is operated with an intermittent action at the start of the clutching action to cause it to pick up the driven-member gradually.

In testimony whereof I hereunto affix my signature.

CHESTER F. SEARLE.

CERTIFICATE OF CORRECTION.

Patent No. 1,811,974.  Granted June 30, 1931, to

CHESTER F. SEARLE.

It is hereby certified that error appears in the printed specification of the above numbered patent requiring correction as follows: Page 6, line 113, claim 8, strike out the words "inertia-element adapted to be set in motion by"; page 7, line 119, claim 17, for the article "the" read and; and that the said Letters Patent should be read with these corrections therein that the same may conform to the record of the case in the Patent Office.

Signed and sealed this 6th day of October, A. D. 1931.

M. J. Moore,
Acting Commissioner of Patents.

(Seal)

CERTIFICATE OF CORRECTION.

Patent No. 1,811,974.  Granted June 30, 1931, to

CHESTER F. SEARLE.

It is hereby certified that error appears in the printed specification of the above numbered patent requiring correction as follows: Page 6, line 113, claim 8, strike out the words "inertia-element adapted to be set in motion by"; page 7, line 119, claim 17, for the article "the" read and; and that the said Letters Patent should be read with these corrections therein that the same may conform to the record of the case in the Patent Office.

Signed and sealed this 6th day of October, A. D. 1931.

(Seal)

M. J. Moore,
Acting Commissioner of Patents.